United States Patent [19]

Maeyama et al.

[11] Patent Number: 5,230,673
[45] Date of Patent: Jul. 27, 1993

[54] EXERCISER IN WHICH EXERCISING LOAD IS CONTROLLED BASED ON INDIVIDUAL DATA STORED IN AN OPTICAL DATA CARD

[75] Inventors: Hachiro Maeyama, Nara; Takashi Ueda, Izumi; Masaaki Matsumoto, Sakai, all of Japan

[73] Assignee: Cat Eye Co., Ltd., Osaka, Japan

[21] Appl. No.: 663,243

[22] Filed: Mar. 1, 1991

[30] Foreign Application Priority Data

Mar. 9, 1990 [JP] Japan ................ 2-24075[U]

[51] Int. Cl.⁵ .......................... A63B 21/005
[52] U.S. Cl. ........................... 482/5; 482/57; 482/900; 482/902; 482/903; 128/25 R; 235/487; 250/569; 283/901; 283/904
[58] Field of Search ............ 482/1, 3, 5, 4, 6, 8, 482/52, 57, 900-903; 128/25 R, 25 B; 273/138 R, 295, 139, DIG. 28; 434/247; 283/102, 901, 904; 235/454, 456, 487, 494, 375; 250/569, 568, 566

[56] References Cited

U.S. PATENT DOCUMENTS

| 3,836,754 | 9/1974 | Toye et al. | 235/487 X |
| 3,959,630 | 5/1976 | Hogberg | 235/487 X |
| 4,295,051 | 10/1981 | Graf et al. | 250/569 |
| 4,591,190 | 5/1986 | Clark | 273/139 X |
| 4,642,769 | 2/1987 | Petrofsky | 482/900 X |
| 4,678,182 | 7/1987 | Nakao et al. | 482/901 X |
| 4,735,410 | 4/1988 | Nobuta | 482/901 X |
| 4,790,528 | 12/1988 | Nakao et al. | 128/25 R X |
| 4,817,940 | 4/1989 | Shaw et al. | 482/901 X |
| 4,831,242 | 5/1989 | Englehardt et al. | 364/410 X |

Primary Examiner—Richard J. Apley
Assistant Examiner—Joe H. Cheng
Attorney, Agent, or Firm—Allegretti & Witcoff, Ltd.

[57] ABSTRACT

An exerciser in accordance with the present invention includes a load apparatus for applying load to pedaling of a user, pulse data detecting apparatus for detecting pulse data of the user, a card for storing optically readable individual data such as age and physical strength of the user, optical reading means for optically reading the individual data stored in the data card, and control means for controlling the magnitude of load applied by the load apparatus based on the read individual data and the detected pulse data.

5 Claims, 16 Drawing Sheets

FIG. 19

| REG DATA (BIT NOTATION) | NUMERICAL VALUE X |
|---|---|
| 0 0 0 0 1 0 0 0 0 0 1 | 0 |
| 0 0 0 0 1 0 0 0 0 1 0 | 1 |
| 0 0 0 0 1 0 0 0 1 0 0 | 2 |
| 0 0 0 0 1 0 0 1 0 0 0 | 3 |
| 0 0 0 0 1 0 1 0 0 0 0 | 4 |
| 0 0 0 0 1 1 0 0 0 0 0 | 5 |
| 0 0 0 1 1 0 0 0 0 0 0 | 6 |
| 0 0 1 0 1 0 0 0 0 0 0 | 7 |
| 0 1 0 0 1 0 0 0 0 0 0 | 8 |
| 1 0 0 0 1 0 0 0 0 0 0 | 9 |

EXERCISER IN WHICH EXERCISING LOAD IS CONTROLLED BASED ON INDIVIDUAL DATA STORED IN AN OPTICAL DATA CARD

BACKGROUND OF THE INVENTION

Field of the Invention

The present invention relates to a pedaling exerciser (hereinafter referred to as "exerciser"), and more specifically, to an exerciser which can be easily used for exercising by pedaling, used in a field of equipments for improving physical strength of users.

Description of the Background Art

Various exercisers for home use and for business use as equipments for promoting health has been proposed.

Japanese Patent Publication No. 58-8267 discloses an example of such prior art, showing an exerciser including a mechanical structure portion including a frame, a rotary portion including pedals, a brake portion of eddy current system, a control system including a sensor, and a control panel including a display window.

However, in the invention disclosed in the above mentioned patent publication, when the exerciser is used, an user must input target exercise data, and the control system in the exerciser controls load on the brake portion based on the data every time the exerciser is used. Therefore, the user must input his own individual data through the control panel every time he uses the exerciser, which data input was troublesome.

In addition, in the invention disclosed in the above patent publication, control of the brake portion (amount of load) was standardized, and therefore it could not sufficiently follow physical condition of the user, which might be changed at every use. Namely, control appropriate for the increase of pulse rate of the user or appropriate for the target pulse rate which might be different at every use, could not be done. Therefore, a preferable mode of training, which can increase the pulse rate to the target value and maintain the same could not be automatically executed, in consideration of difference among individuals.

In view of the foregoing, the applicant of the present application has proposed a nobel exerciser in U.S. Ser. No. 773306.

According to the exerciser, individual data such as age, physical strength and the like of the user are stored in advance in the exerciser, and at the time of use, an individual identifying code for identifying the user is input. Then, the individual data corresponding to the identifying code is read, and based on the data and pulse data detected during use, the magnitude of load is controlled. Therefore, different from the exerciser disclosed in the above mentioned patent publication, it is not necessary to input individual data at every use, and therefore it is very convenient.

Although such an exercise is more convenient, it still has some disadvantages. More specifically, when the exerciser is used, the user must at first select and input training mode manually, and then he must correctly input the individual identification code by ten keys or the like. If the input of the individual identification code is incorrect, it is possible that safety during exercise cannot be ensured, since the magnitude of load is controlled based on a data of a stranger.

There is an economical disadvantage as well as disadvantages during use. More specifically, for storing individual data, memory means having a prescribed storage capacity is necessary. If the exerciser is for business use, memory means having large capacity is necessary when the number of users is large, which naturally costs much. Meanwhile, if the storage capacity is limited, the number of users must be limited, which is also disadvantageous for business purpose.

SUMMARY OF THE INVENTION

An object of the present invention is to facilitate use of an exerciser.

Another object of the present invention is to provide an exerciser which is more economical.

A further object of the present invention is to improve reliability in use of the exerciser among individuals.

A still further object of the present invention is to facilitate management of individual data in the exerciser.

A still further object of the present invention is to provide a data card which facilitates storage of individual data in the exerciser.

In order to attain the above described objects, the exerciser in accordance with the present invention comprises: load means for applying load to pedaling exercise of a user; data detecting means for detecting data during pedal exercise of the user; data storing means for storing individual data of the user; data receiving means to which data storing means is inserted; data reading means for reading data stored in the data storing means inserted in the data receiving means; and control means for controlling magnitude of load of the load means based on the detected data and read data.

In the exerciser structured as described above, individual data can be easily read by simple insertion of the data storing means and load can be controlled based thereon, it is convenient for use, and data storing means of large capacity is not necessary in the exerciser body.

The foregoing and other objects, features, aspects and advantages of the present invention will become more apparent from the following detailed description of the present invention when taken in conjunction with the accompanying drawings.

DESCRIPTION OF THE DRAWINGS

FIG. 19 shows relation between REG data and numerical value X related to the flow chart of FIG. 17.

DESCRIPTION OF THE PREFERRED EMBODIMENTS

Figure 2:
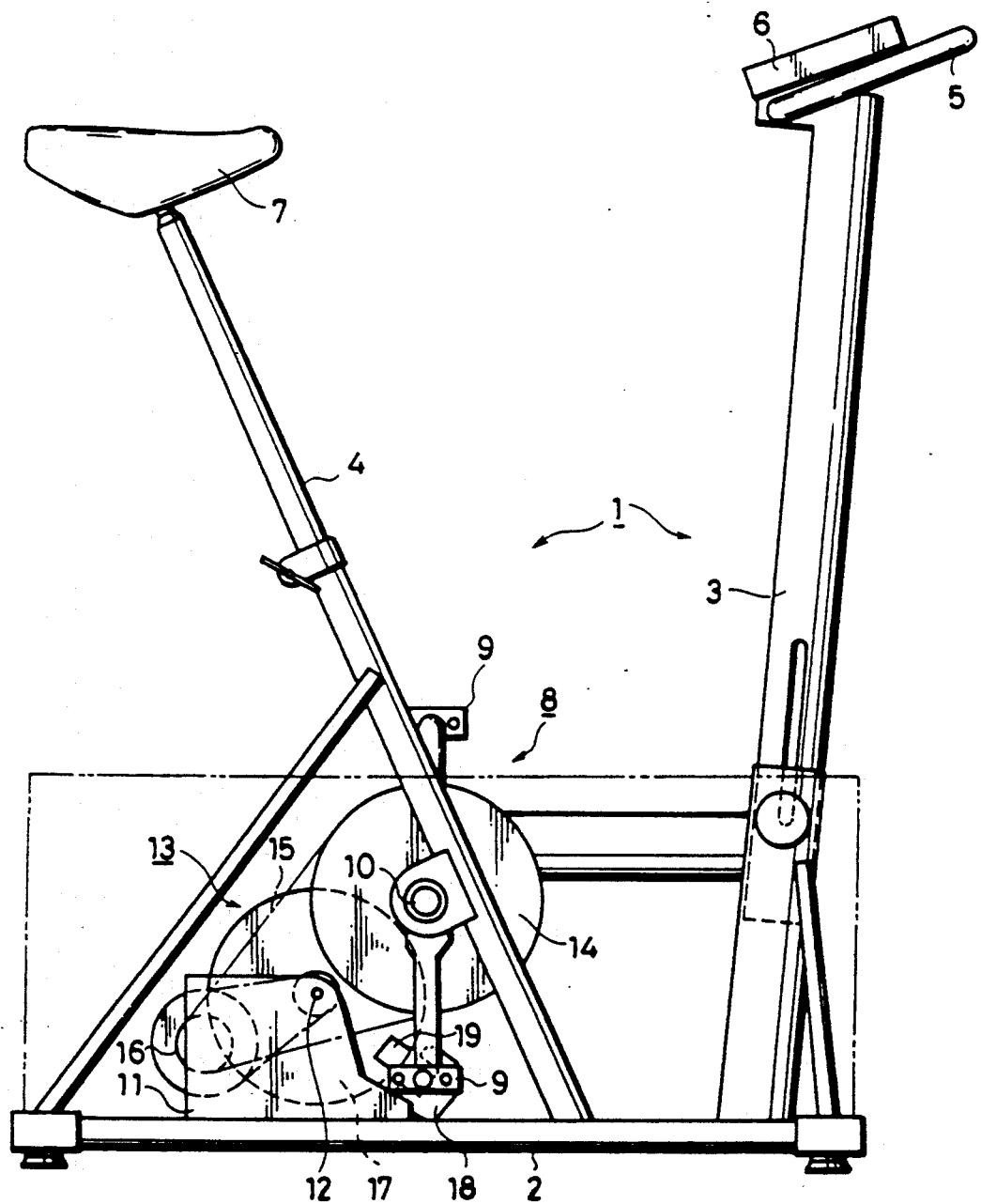
FIG. 2 shows a schematic structure of the exerciser of the above embodiment.

FIG. 2 shows a whole structure of an exerciser in accordance with one embodiment of the present invention.

Referring to the figure, a frame 1 formed of a structural member includes at least a base 2, a front support 3 and a rear support 4, with the height of these supports changeable. A handle having a loop planar shape and a control panel 6 are provided at an upper end of the front support 3. The control panel 6 contains a control function apparatus therein, as will be described later, and keyboards for changing various data, display for displaying data and so on are provided on the surface thereof. A saddle 7 is attached to the upper end portion of the rear support 4. A load apparatus 8 is provided on the base 2.

The load apparatus 8 includes a crank shaft 10 attached to the rear support with pedals 9, and a load shaft 12 supported by a frame 11 on the base 2. A speed increasing mechanism 13 increasing speed by two steps couples the crank shaft 10 with the load shaft 12. The speed increasing mechanism 13 comprises a crank wheel 14, a chain 15, a flywheel 16 and so on, with the rate of speed increase set at a constant value.

A disk 17 formed of a copper plate is fixed on the load shaft 12. The periphery of the disk 17 is positioned in, but not in contact with, a C shaped core 19 of a brake coil 18, thus providing an eddy current brake. The details of the load apparatus 8 is described in U.S. Pat. No. 4,775,145.

Figure 1:
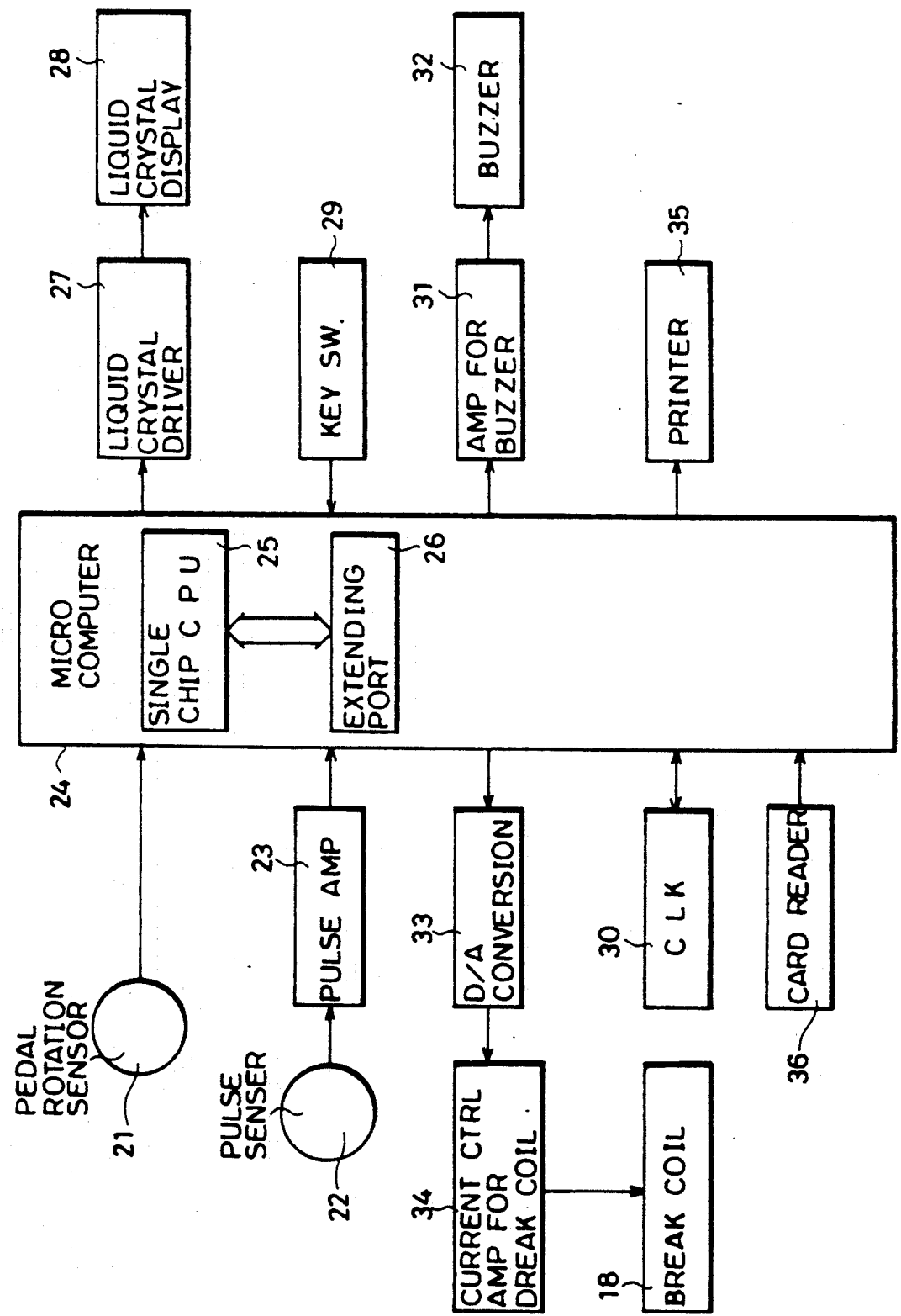
FIG. 1 is a block diagram showing a whole structure related to control of an exerciser in accordance with one embodiment of the present invention.

FIG. 1 is a block diagram showing a structure of a control system in accordance with one embodiment of the present invention.

Referring to FIG. 1, a pedal rotation sensor 21 is provided in connection with the pedal 9 of FIG. 2 for detecting the number of rotation of the pedal 9. More specific structure of such a sensor 21 is disclosed in, for example, U.S. Pat. No. 4,636,769.

A pulse sensor is attached to an earlobe of a user of the exerciser for detecting pulse rate of the user. A sensor disclosed in U.S. Ser. No. 773,292 filed by the applicant of the present invention may be used as the pulse sensor 22. A pulse amplifier 23 connected to the pulse sensor 22 is to amplify the pulse rate detected by the pulse sensor 22. It may be formed integrally with the pulse sensor 22, or it may be formed separately.

Figure 7:
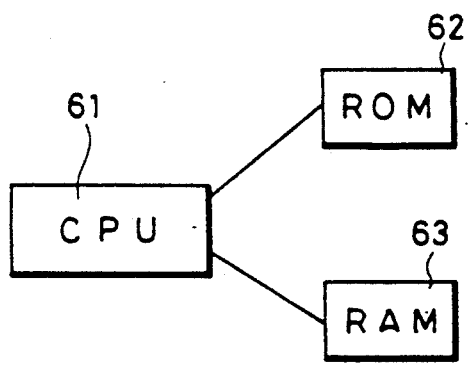
FIG. 7 shows a specific structure of a single chip CPU shown in FIG. 10.

Data detected by the pedal rotation sensor 21 and the pulse sensor 22 are applied to a microcomputer 24. The microcomputer 24 is structured so as to comprise a single chip CPU 25 having a memory function, and an extending port 26 for extending the memory function. A specific structure of the single chip 25 is shown in FIG. 7. A ROM 62 for storing control program of the operation of the exerciser, and a RAM 63 for storing input individual data and the like as needed are connected to a CPU 61.

Processed output data from the microcomputer 24 is displayed on a liquid crystal display 28 through a liquid crystal driver 27. A card reader 36 reads an optical data card (which will be described in detail later) storing individual data and the like, and inputs the individual data and the like to the microcomputer 24. The output data is also printed out on a sheet of recording paper by a printer 35. A key switch portion 29 and a clock 30 are connected to the microcomputer 24. The key switch portion 29 comprises keys for manually selecting operation modes of the exerciser, keys for correcting individual data and the like, keys for manually inputting data, and so on. The clock 30 serves to measure prescribed time interval necessary for the microcomputer 24. Further, a buzzer 32 is connected to the microcomputer 24 through a buzzer amplifier 31. The buzzer 32 is provided for informing the user of the exerciser that a prescribed exercise is completed, and for giving an alarm in case of emergency.

The microcomputer 24 controls the brake coil 18 (see FIG. 2) through a digital-analog (D/A) converter 33 and a current controlling amplifier 34 for the brake coil. The eddy current brake is controlled by the brake coil 18, and the load of the load apparatus of the exerciser is controlled. One example of such control is disclosed in U.S. Pat. No. 4,775,145.

The microcomputer 24, liquid crystal driver 27, liquid crystal display 28, key switch portion 29, clock 30, card reader 36, amplifier 31 for the buzzer, buzzer 32, D/A converter 33 and current control amplifier 34 for the brake coil are contained in or provided on the surface of, the control panel 6 shown in FIG. 2.

Figure 3:
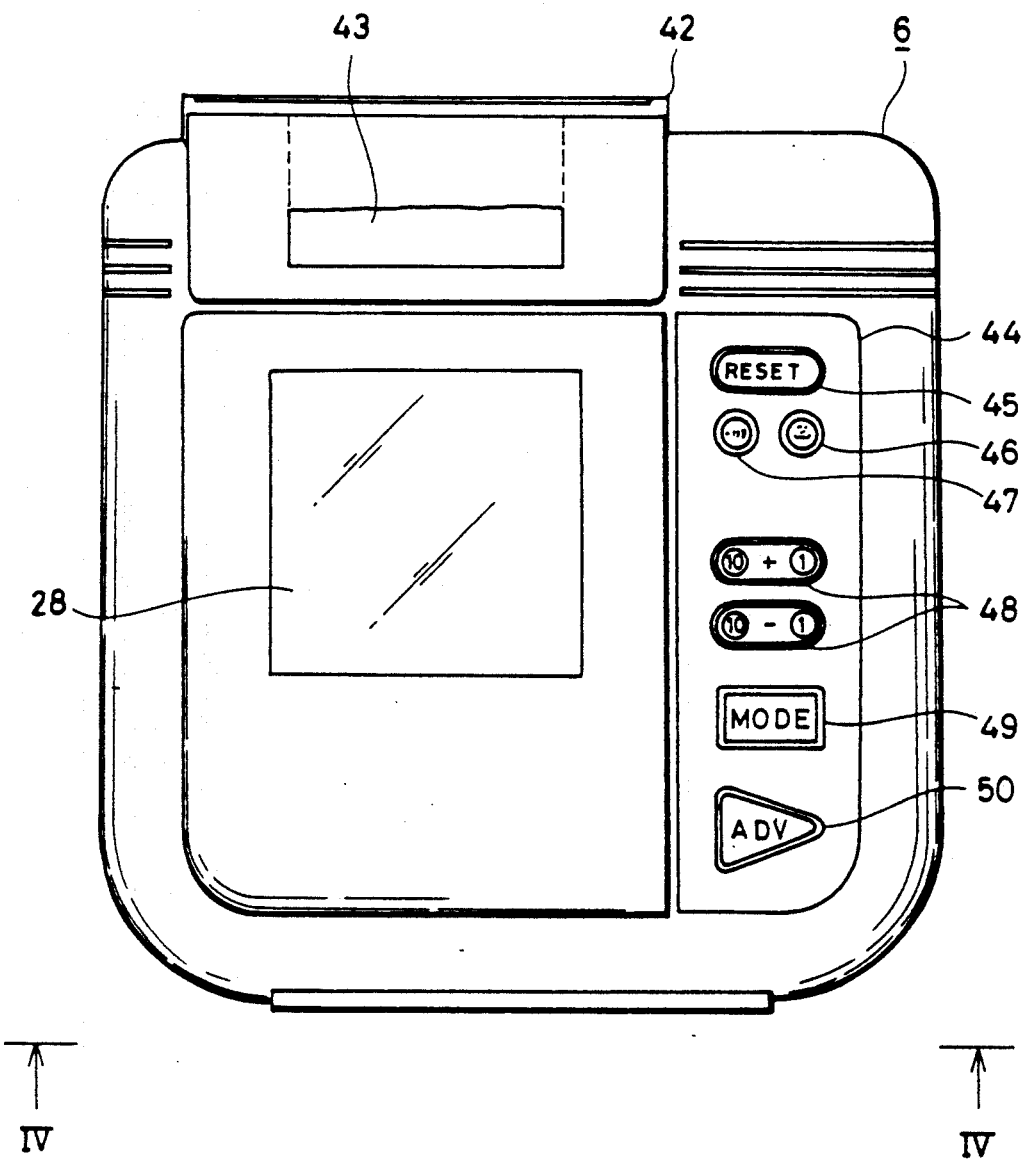
FIG. 3 is a plan view of a control panel shown in FIG. 2.
Figure 4:
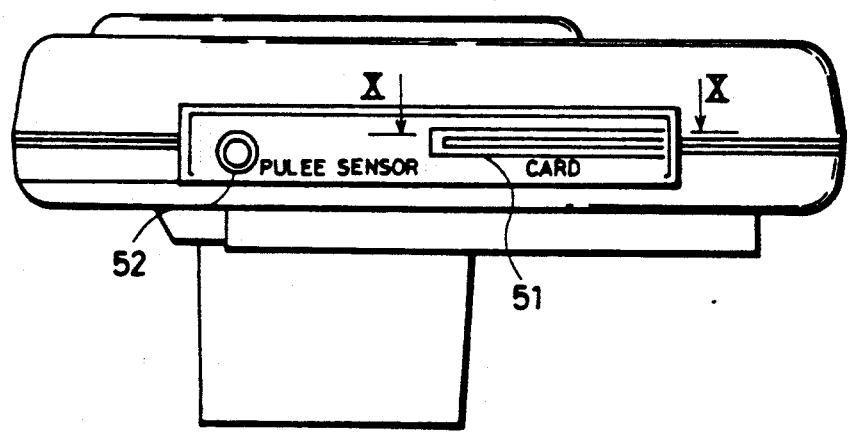
FIG. 4 is a front view taken along the line IV—IV of FIG. 3.

FIG. 3 is a plan view of the control panel 6, and FIG. 4 is a front view thereof.

Referring to FIG. 3, a liquid crystal display 28 is provided at the center of the control panel. A printer portion is provided thereabove, and a printer cover 42 is provided for protecting the printer body and an outlet 43 of sheets of recording paper. On the right side of the liquid crystal display 28, a switch button panel 44 on which various switches are arranged is provided.

Functions of the various switches on the switch button panel 44 will be described.

A reset button 44 is to reset the program to an initial state. A clock sound on/off button 46 is for switching between operable state of the clock sound and inoperable state of the clock sound. A printer on/off button 46 is for switching between operable and inoperable states of the printer. As to numeric value increasing/decreasing buttons 48, an input numerical value, which is flickering, is increased or decreased ten by ten when a 10 key is pressed, and it is increased or decreased one by one when 1 button is pressed. If the input value is a torque value (Kg·m), it is increased or decreased one by one or 0.1 by 0.1. A flickering mark "+ 1" on the liquid crystal panel represents male, while "−1" represents female. During exercise, the numerical value increasing/decreasing buttons 48 is used for increasing/decreasing torque value one by one by pressing the button 10 and 0.1 by 0.1 by pressing button 1.

During input operation, a mode button 49 is used for selecting a program and for switching data to be changed. During exercise, it is used for switching between display of exercise time and display of consumed calorie.

An operation button 50 is used for the proceeding of control program, for example start/stop of the program.

Referring to FIG. 4, a pulse sensor jack 52 to which a connection code of the pulse sensor is inserted, is provided on a front surface of the control panel 6. A card inlet 51 to which an optical data card storing individual data and the like is inserted, is provided on the right side thereof.

Figure 5:
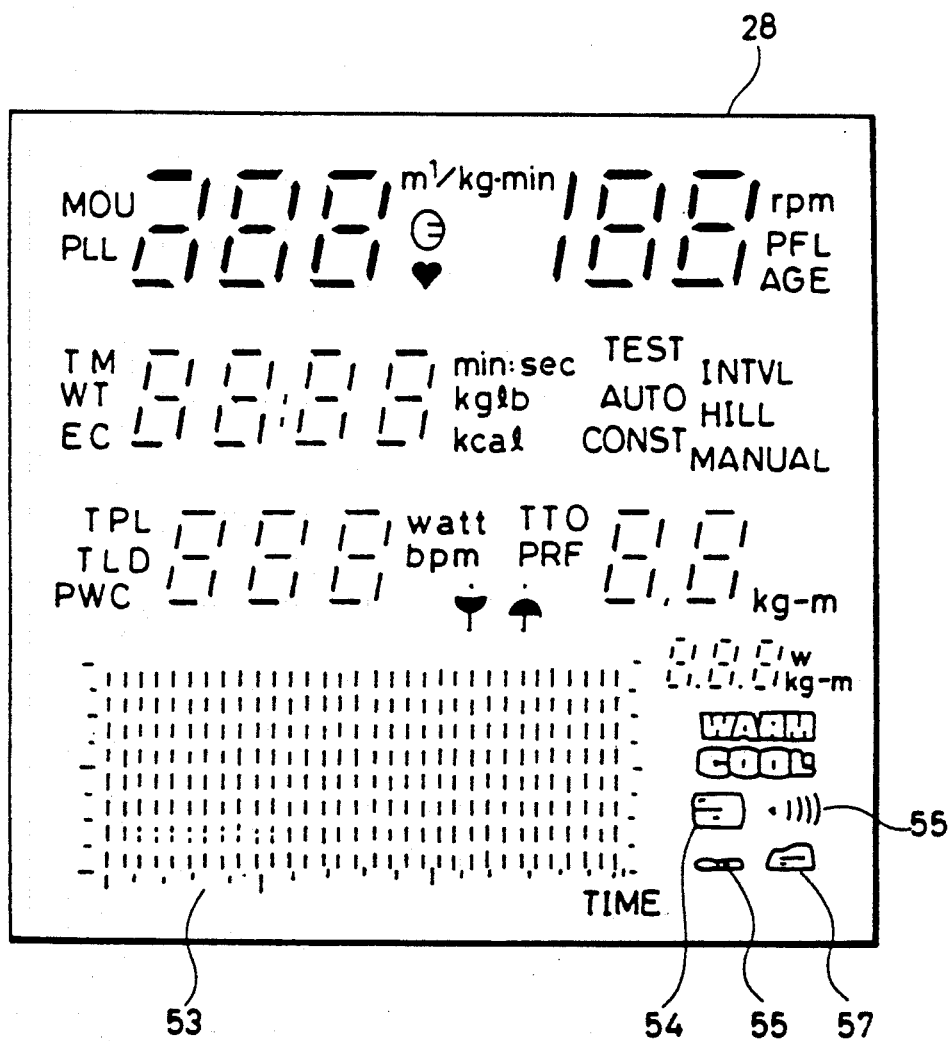
FIG. 5 shows details of a liquid crystal display portion 28 shown in FIG. 3.

FIG. 5 shows the details of the liquid crystal display of FIG. 3.

Referring to the figure, "PLL" represents limit pulse rate, and "MOU" represents maximum oxygen uptake of the user. If "PLL" is displayed on the display panel, for example, the numerical value on the right side thereof represents the limit pulse rate.

Similarly, "TM" represents lapse time, "WT" represents weight of the user, and "C" represents calorie consumed by the exercise. The numerical value on the right side thereof represents time, weight or calorie as represented by one of these marks which is lit up.

"TPL" represents target pulse rate, "TLD" represents target load, and "PWC" represents physical work capacity. "TTQ" represents target torque, and "PRF" represents selection of hill profile in hill profile training. "rpm" represents the number of rotation of the pedal, "PFL" represents physical level of the user, and "AGE" represents age of the user. "TEST" represents physical strength test mode, "AUTO" represents auto training mode, "CONST" represents isometric power training mode, "INTVL" represents interval training mode, "HILL" represents hill profile training mode, and "MANUAL" represents manual training mode, which displays are selected when respective programs are selected.

"WARM" is a mark representing warming up state, and "COOL" is a mark showing a cooling down state. A card mark 54 is to confirm whether or not the optical data card is inserted and individual data is input by that card. A clock sound mark 55 shows, when it is lit up, that there will be clock sound. A battery alarm mark 56 indicates, when it is lit up, that the battery must be changed. A printer mark 57 indicates, when it is lit up, that the printer is in operation. The abscissa of a load display portion 53 represents lapse time, and the ordinate represents load scale, that is, weight of the pedal. The state of load control during exercise is displayed on this load display portion.

As described above, 6 different exercising modes can be selected in the exerciser of the present embodiment. The respective modes will be briefly described in the following.

① Physical Strength Test Mode

The weight of the pedal is changed by 3 steps in 10 minutes, and based on the change of the pulse rate, aerobic power: maximum oxygen uptake, which is regarded as an indication of whole body endurance, is estimated.

② Auto Training Mode

This mode is for training with the pulse rate kept constant. When target of training is set by the pulse rate, the weight of the pedal of the exerciser is automatically increased or decreased so that the pulse rate is kept at the constant target value.

③ Isometric Power Training Mode

In this mode the amount of the exercise, that is, watt number is kept constant. Even if the number of rotation of the pedal is changed, the weight of the pedal is automatically changed so as to keep the watt number constant.

④ Interval Training Mode

In this mode, exercise and rest are repeated alternately, so as to improve physical strength by adjusting strength and distribution of time of exercise and rest.

⑤ Hill Profile Training Mode

The weight of the pedal is changed as time passes. The change of the weight of the pedal has hill profile, as shown on the load display portion 53.

⑥ Manual Training Mode

This training mode is for the common use, in which the weight of the pedal, that is, torque is designated manually.

Figure 6A:
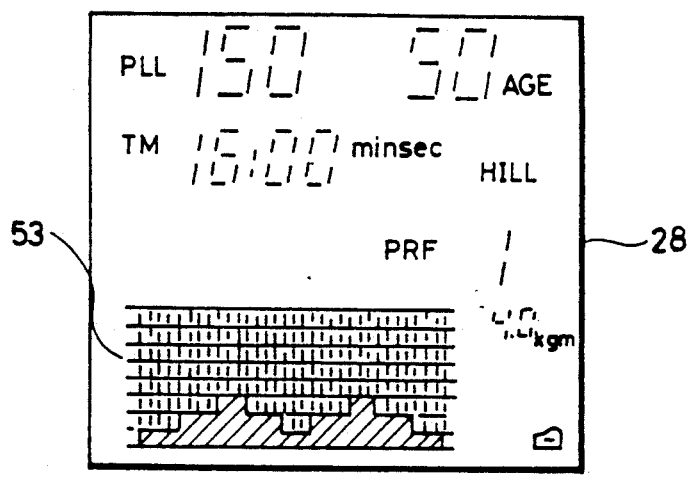
FIGS. 6A to 6C show examples of specific displays on the liquid crystal display portion shown in FIG. 5.
Figure 6B:
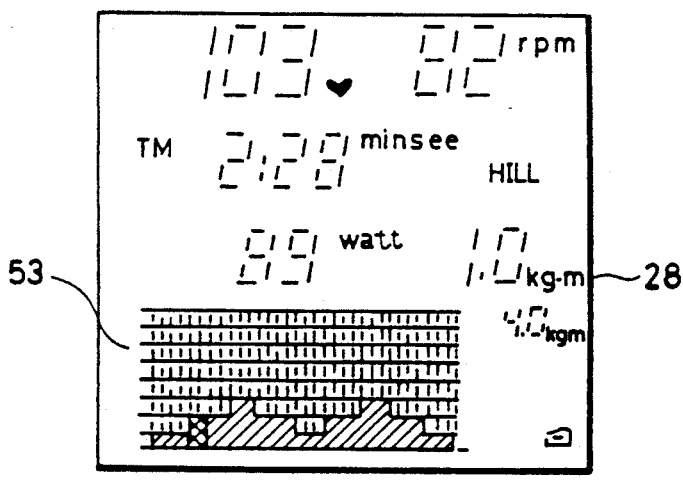
Figure 6C:
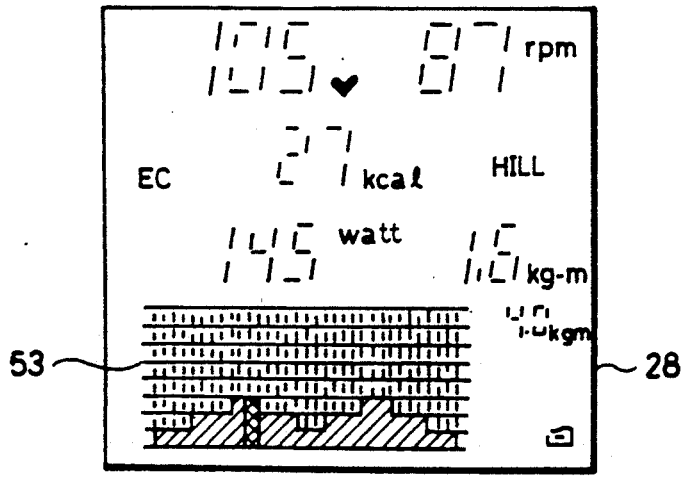

FIGS. 6A to 6C show examples of display on the liquid crystal display portion 28, when a user exercises with the optical data card inserted into the exerciser.

FIG. 6A show the display on the liquid crystal display portion at the time when the optical data card storing prescribed individual data is inserted.

Referring to the figure, "50" represents age, and "150" shows a pulse rate at which a safety function (limit pulse rate alarm) is performed, that is, an alarm is automatically given and the weight of the pedal is decreased, if that value is exceeded during training. "16:00" represents time required for the training which is to be done, and in this example, the time for training is 16 minutes. "HILL" represents that the training which is to be done is in the "Hill Profile Training" mode. "1" indicates that one of prescribed load modes in these training mode is selected. The state of load corresponding to the type of the selected load is displayed on the load display portion 53.

FIG. 6B shows the display on the liquid crystal display portion 28 when an ADV button 50 of FIG. 3 is pressed.

Referring to the figure, "103" represents pulse rate per minute of the user, and "82" represents the number of rotation of the pedal per minute. "2:28" shows that two minutes 20 seconds have passed from the start of training. "89" represents the amount of exercise (watt), and "1.0" represents the weight of the pedal (kg·m). On the load display portion 53, the portion of "" moves as time passes, and based on the portion of this mark, it can be seen at which point of the whole training period the present state of training correspond.

FIG. 6C shows calorie display given by pressing MODE button of FIG. 3.

When the MODE button is pressed during the use of the exerciser, the display of lapse time is changed to a display of consumed calorie (kcal) (consumed energy from the start of training to the present time).

Figure 8A:
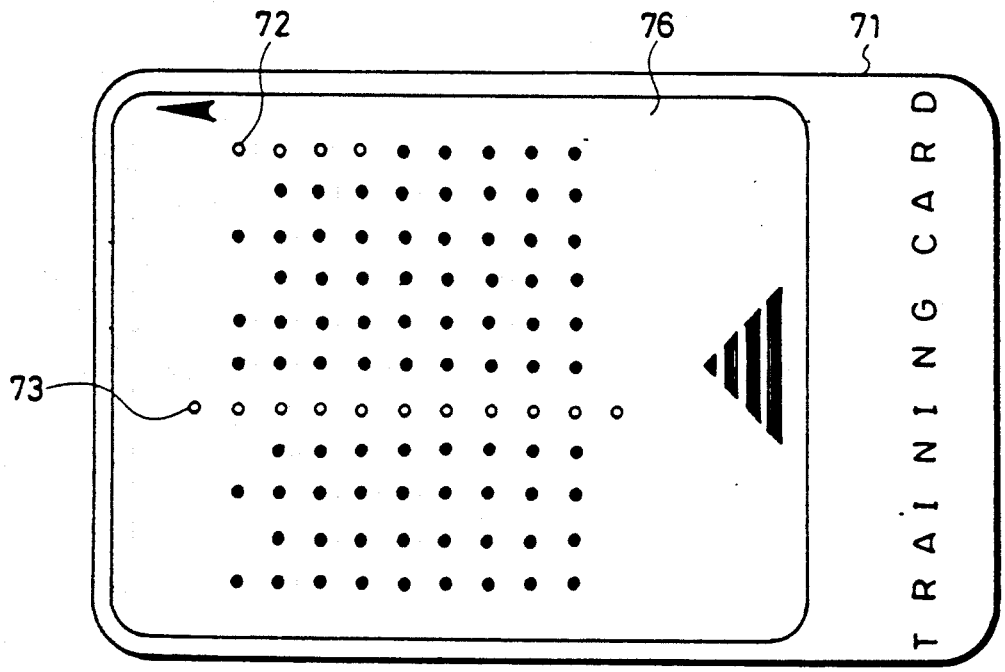
FIGS. 8A and 8B show front and rear surfaces of an optical data card in accordance with the above embodiment of the present invention, before designation of individual data.
Figure 8B:
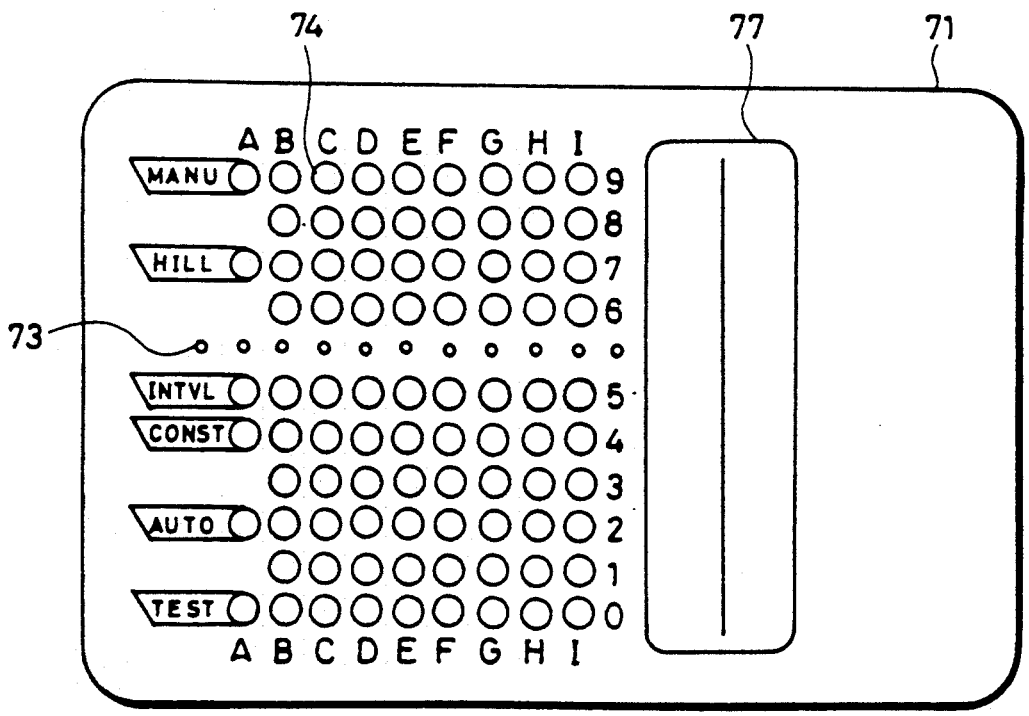

FIG. 8A is a plan view of an optical data card before writing data, used in one embodiment of the present invention, and FIG. 8B shows a rear surface thereof.

In the figure, a light intercepting film 76 is formed approximately on the entire surface of the optical data card, and data detecting holes 72 arranged in a matrix are provided therein. Approximately at the central portion of the matrix of the data detecting holes 72, one row of timing detecting holes 73 is provided. On the rear surface, displays representing various modes are provided on the left side and light intercepting pieces 74 intercepting passage of light are provided at positions corresponding to each of the data detecting holes 72. The light intercepting piece 74 can be easily peeled off by scraping by a coin or the like, and the data detecting hole 72 with the light intercepting piece peeled off passes light. 9 characters Al to I are provided on the row direction of the light intercepting pieces 74 arranged in a matrix. Meanwhile, 10 numerals from 0 to 9 are provided in the column direction. On the right side of the light intercepting pieces 74 arranged in a matrix, a space 77 is provided for writing name of the owner of the individual data employed for use of the exerciser. As is apparent from these figures, before the use of the optical data card, light intercepting pieces 74 are attached to all the data detecting holes 72, so that holes other than the timing detecting holes 73 do not pass light. Method of designating individual data by the data card will be described.

First, the column "A" is used for designating the above described various program modes. Columns "B" and "C" are to designate age. "B" corresponds to the second digit of ones age, and "C" designates the first digit of his age. "D" and "E" designate exercise time. Column "D" designates the second digit of the exercise time, and column "E" designates the first digit of the exercise time.

The column "F" is for designating exercise pattern when interval training or hill profile training program is selected. If other training modes are designated, designation by this column is neglected.

Columns "G" "H" and "I" are for designating training targets.

For example, if automatic training mode is designated, these columns are used for designating target pulse rate, and column "G" corresponds to the third digit, column "H" corresponds to the second digit, and column "I" corresponds to the first digit.

When the isometric power training mode is set, these columns are used for designating watt number, and column "G" corresponds to the third digit, column "H" corresponds to the second digit and column "I" corresponds to the first digit.

If interval training mode is designated, these columns are used for designating target torque. Column "H" corresponds to the first digit, and column "I" corresponds to the decimal digit, respectively. In this case, designation by the column "G" is neglected.

If the hill profile training mode is designated, designation by the columns "G" "H" and "I" is neglected.

If the manual training mode is designated, these columns are used for designating set torque value. Column "H" corresponds to the first digit, and column "I" corresponds to the first digit of decimal notation. In this case, designation by the column "G" is neglected.

If physical strength test mode is designated by the card, columns "D" "E" and "F" are used for designating weight, which corresponds to the third, second and first digits, respectively. In this case, the column "G" designates sex, and "0" corresponds to female and "1" corresponds to male.

Figure 9A:
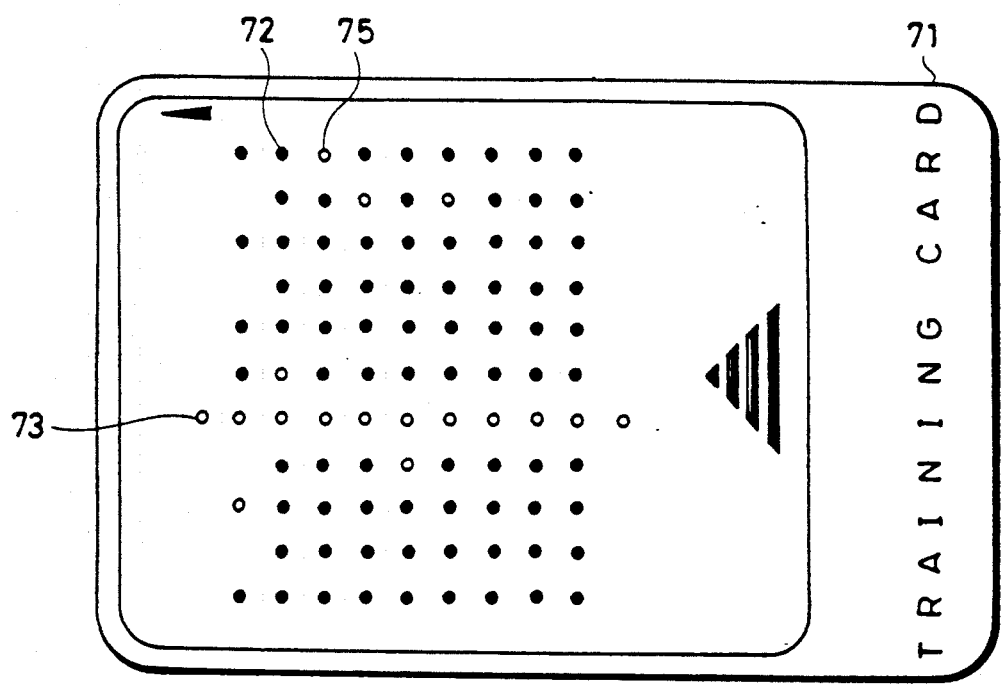
FIGS. 9A and 9B show front and rear surfaces of the optical data card in accordance with the above embodiment of the present invention, after data is written.
Figure 9B:
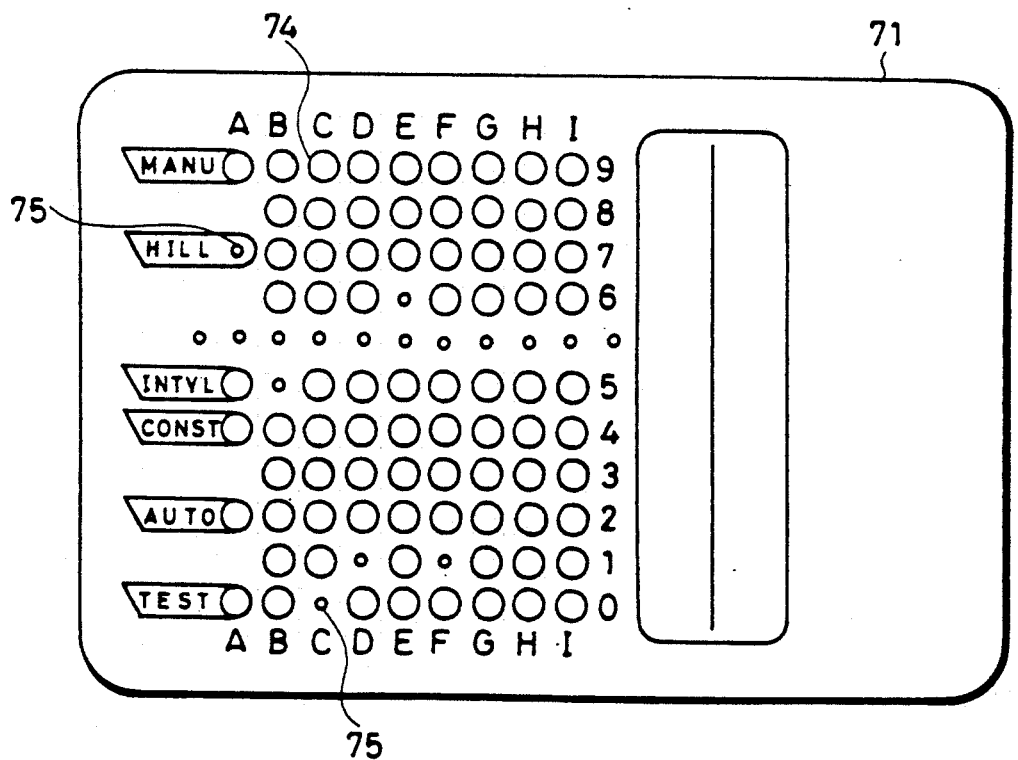

FIG. 9A shows a front surface of the optical data card in which individual data is stored, and FIG. 9B shows the rear surface thereof.

In this example of the optical data card, the individual data shown in FIG. 6A is stored.

Namely, the hill profile training mode is designated as the program mode, the age of the user is 50, the exercise time is 16 minutes and the pattern of the hill profile is "1". As is apparent from the figure, the light intercepting pieces 74 corresponding to the data detecting holes 72 allotted to set individual data are scraped off by a coin or the like, so that the corresponding detecting holes pass light.

Figure 10:
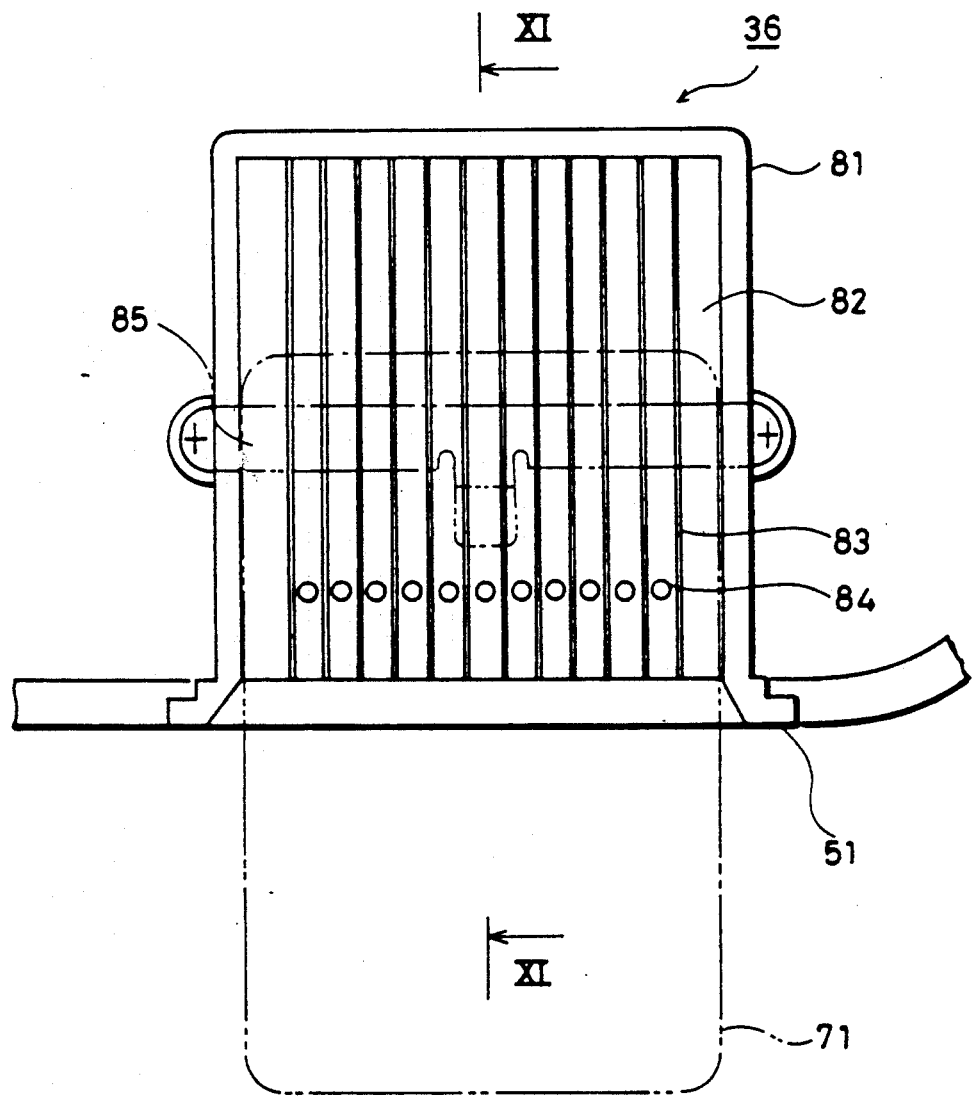
FIG. 10 is a cross section taken along the line X—X of the control panel shown in FIG. 4.

FIG. 10 is a cross section taken along the line X—X of FIG. 4, showing internal structure of a card reader.

Figure 11:
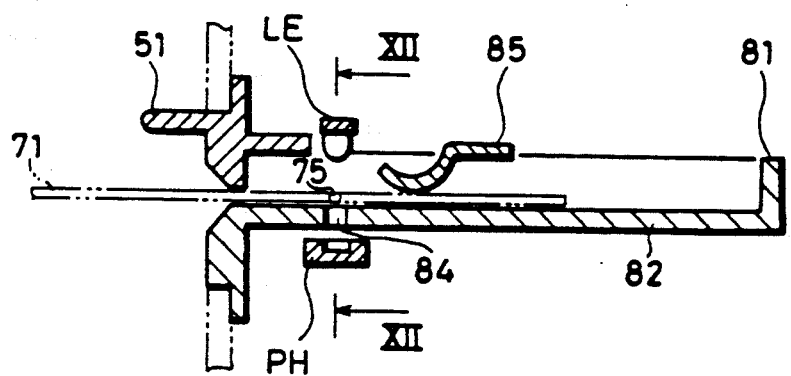
FIG. 11 is a cross section taken along the line XI—XI of FIG. 10.
Figure 12:
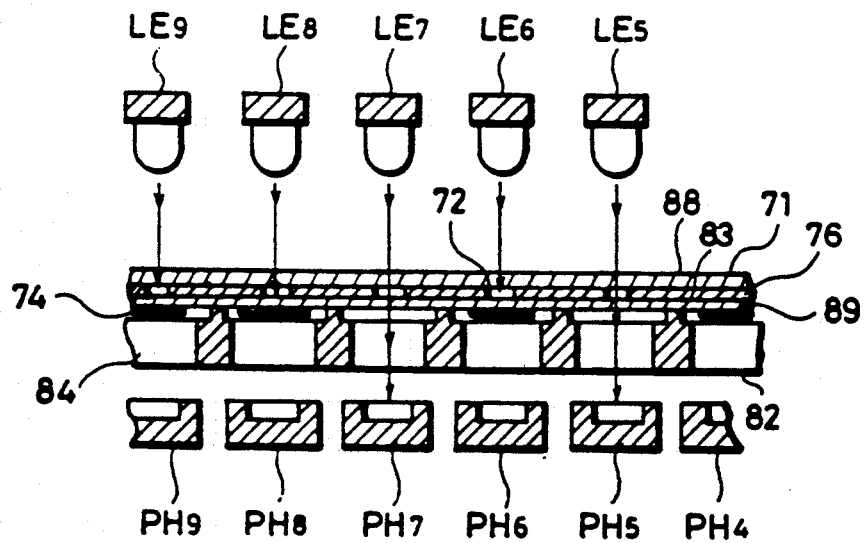
FIG. 12 is a cross section taken along the line XII—XII of FIG. 11.

FIG. 11 is a cross section taken along the line XI—XI of FIG. 10, and FIG. 12 shows a structure of a cross section taken along the line XII-XII of FIG. 11. The structure of the card reader will be described with reference to these figures.

Referring to the figure, the optical data card 71 inserted from a card inlet 51 is held on a holder having a rib 83, and when it is inserted, slipping thereof is prevented by a card retaining plate 85. The holder 82 has its periphery defined by a card inserting frame 81 limiting the range of insertion of the card 71. A plurality of pairs of light emitting elements (LE5 to LE9 in this figure) and photo transistors (PH4 to PH9 in this figure) are provided for sandwiching the holder 82 therebetween. Light emitted from the light emitting elements passes through an opening 82 provided in the holder 82 to be received by the corresponding photo transistors. FIG. 12 shows a state in which the optical data card 71 storing individual data is actually inserted.

When the optical data card 71 is inserted to the card inlet 51, one row of detecting holes of the data detecting holes 72 of the card pass over the opening 84. The state at this time is shown in FIGS. 11 and 12. As shown in FIG. 12, passage of light through the data detecting holes 72 is controlled at portions where the light intercepting pieces 74 are left and where these pieces are scraped off on the optical card 71. For example, light emitted from the light emitting elements LE7 and LE5 passes the data detecting holes 72 as it is, since the corresponding light intercepting pieces 74 are removed, and the timing signal is received by the photo transistor PH7 and a data detecting hole signal is received by PH5 through the openings 84 of the holder 82, respectively. However, since passage of light is shut in other data detecting holes 72 by the corresponding light intercepting pieces 74, light emitted from the light emitting elements is not received by the corresponding photo transistors. In this manner, the individual data designated by the optical data card 71 can be optically read.

Figure 13:
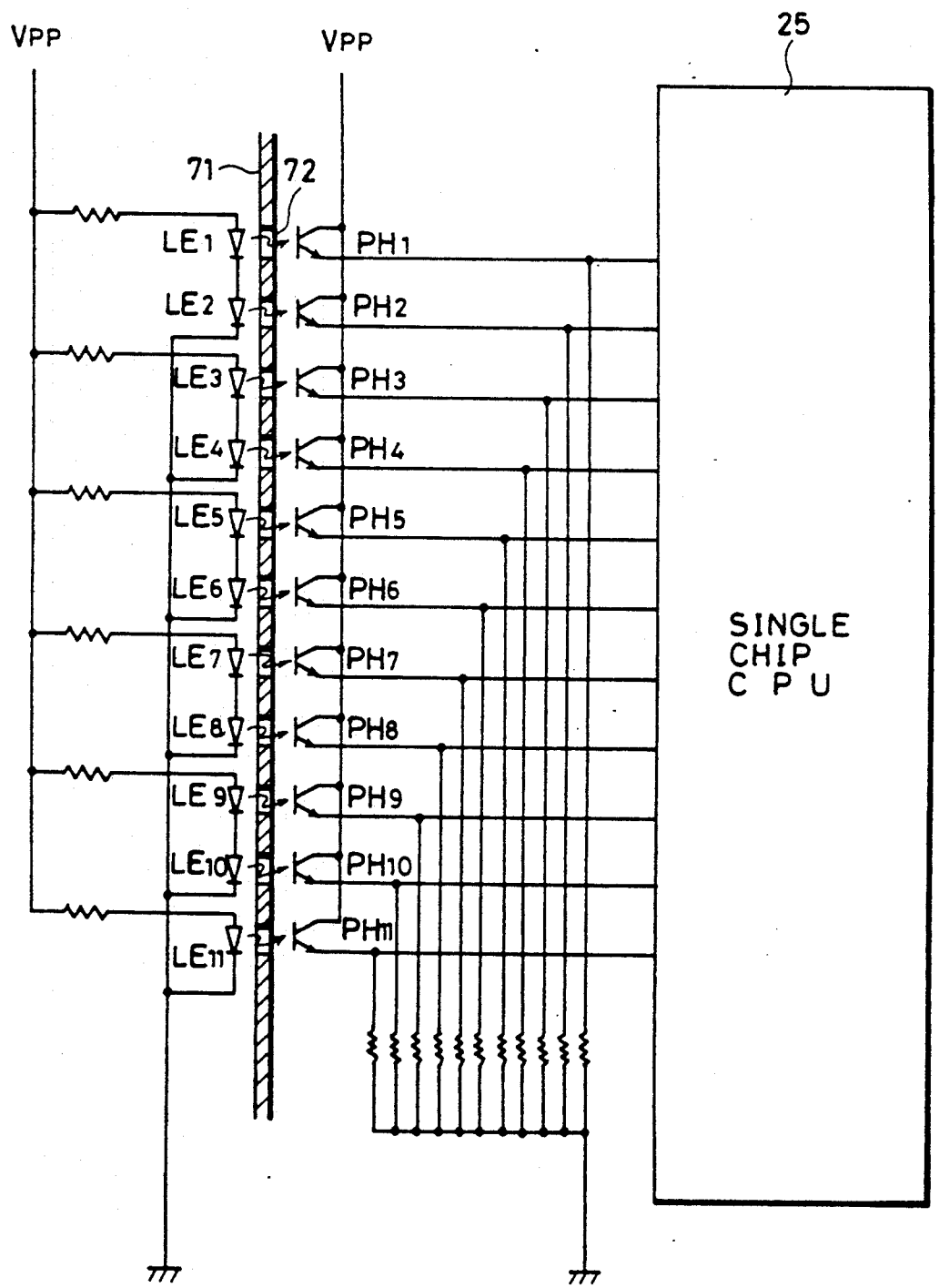
FIG. 13 shows a schematic circuit structure of a reading portion of a card reader shown in FIG. 1.

FIG. 13 is a schematic circuit diagram showing electrical structure of the optical reading portion of the card reader.

Referring to the figure, a power supply voltage $V_{PP}$ is applied to the light emitting elements LE1 to LE11, and these elements emit light of prescribed intensity during use. The power supply voltage is also applied to the photo transistors PH1 to PH11 corresponding to the respective light emitting elements, and one end of each of the photo transistors is set at the ground potential through a resistance. A node between each of the photo transistors and the ground potential is coupled to the single chip CPU 25. By this structure, the light passed through the data detecting hole 72 of the optical card 71 is received by the corresponding photo transistor, and a prescribed amount of current is generated in the photo transistor. Therefore, the potential of the respective nodes is increased. By determining the increase in potential by the single chip CPU 25, whether or not the data detecting hole is opened, namely, the content of the individual data, can be read.

Figure 14A:
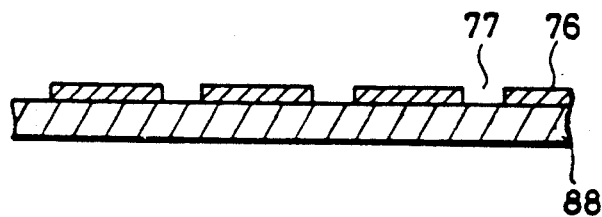
FIGS. 14A to 14C show processes of manufacturing the optical data card in accordance with the above embodiment of the present invention.
Figure 14B:
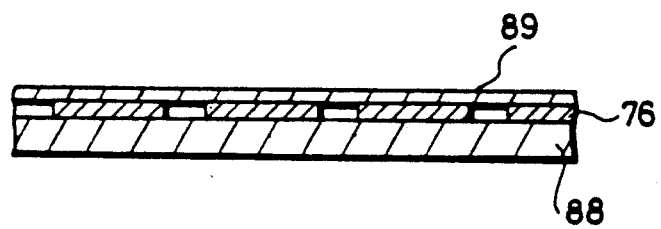
Figure 14C:
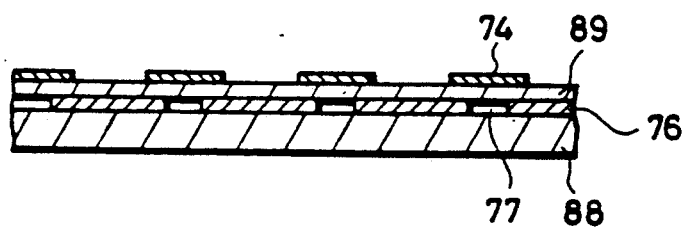

FIGS. 14A to 14C are cross sectional views showing the steps of manufacturing the optical data card 71 in accordance with one embodiment of the present invention.

Referring to the figure, on one surface of a transparent PVC resin (polyvinyl chloride) 88 having the thickness of 0.5 mm, for example, a light intercepting ink 76 having a plurality of openings 77 arranged thereon is applied.(FIG. 14A). The PVC resin may be a colored transparent plate, or a transparent plate. Therefore, materials such as polycarbonate, PET resin (polyethylene terephthalate) may be used.

In order to protect the upper surface of the light intercepting ink 76, laminating is carried out by using a PET resin 89 or the like (FIG. 14B).

Vinyl chloride, polypropylene or the like may be used as the laminate material.

Then, on the upper surface of the laminate material 89, light intercepting ink 74 is applied at positions corresponding to openings 77 of the light intercepting ink 76 (FIG. 14C). A silver ink for PET resin (including polyamide, toluene, xylene, pigment and aluminum powder) is used as the light intercepting ink 74.

Then, ink mixed with a compound is applied on the side of the PET resin 89 of the card manufactured in the above described manner, so as to provide a space on which things can be written. Since the card is manufactured in this manner, passage of light through the data detecting holes 72 through openings 77 is prevented by the light intercepting pieces 74 of silver ink. Since the light intercepting ink 74 is formed as described above, it can be easily scraped off from the laminate material 89 by using a coin or the like.

Figure 15:
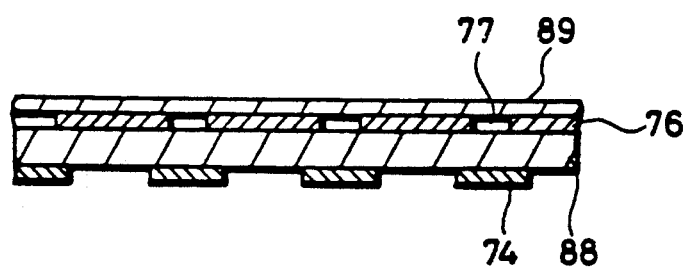
FIG. 15 shows another example of a step during the process of manufacturing the optical data card in accordance with the above embodiment of the present invention.

FIG. 15 shows another embodiment of manufacturing of the optical data card, corresponding to FIG. 14C of the above described embodiment.

Referring to the figure, different from the above embodiment, the light intercepting pieces 74 of the silver ink is formed not on the laminate material 89 but on the transparent plate 88. Passage of light through the openings 77 of the light intercepting ink 76 can be similarly prevented, when the card is formed in this manner. In this case, the transparent plate 88 may preferably be formed of PET resin, in consideration of adhesion strengths of the silver ink.

The above described methods of manufacturing the optical card are examples only, and the cards may be manufactured through other methods, provided that the object of the present invention is fulfilled.

Figure 16:
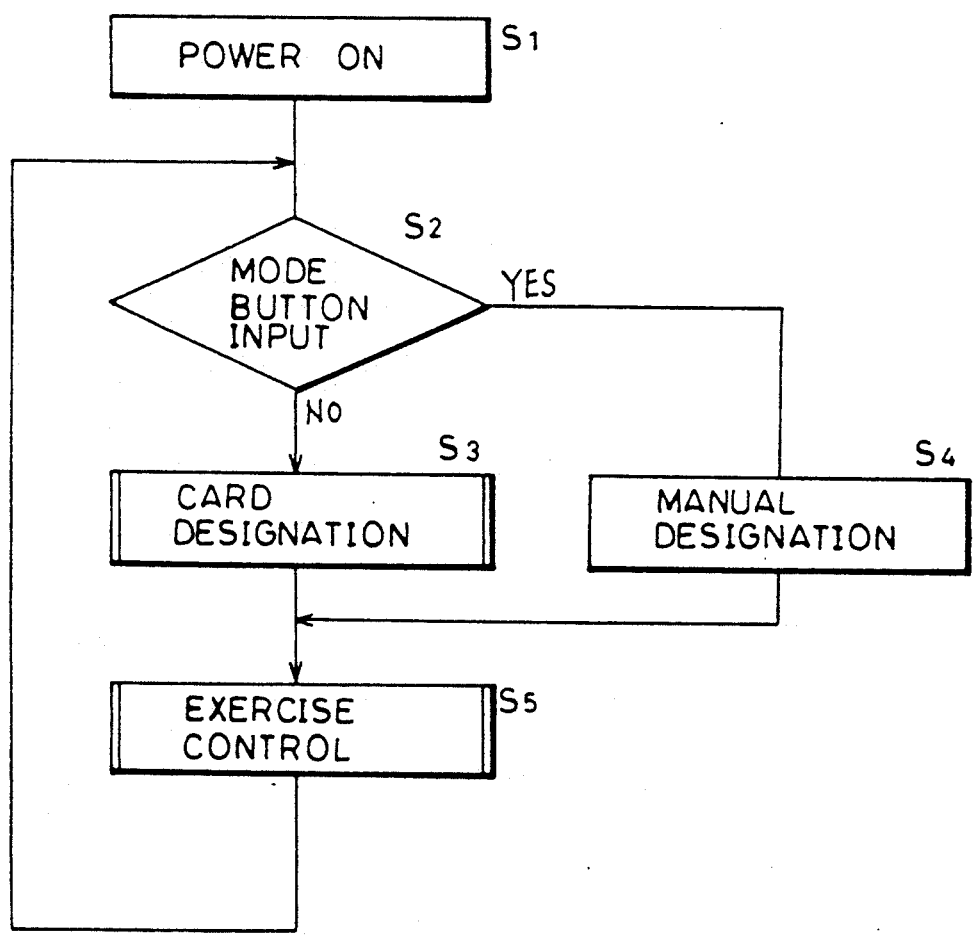
FIG. 16 shows a main routine of the single chip CPU shown in FIG. 1.

FIG. 16 shows a main routine of control operation of the single chip CPU in accordance with one embodiment of the present invention.

First, in step S1, operation is started when power switch of the exerciser is turned on. In step S2, whether or not there is an input of MODE button is determined. When there is an input by the MODE button, conditions of exercise by manual designation is allowed in step S4.

If there is no input of the MODE button, setting of conditions of exercise by insertion of the optical data card is done (step S3). After the conditions of exercise are set by manual designation or designation by the optical card, control of exercise by the exerciser is done in step S5. At the end of exercise, the flow returns to step S2 to be ready for the next use of the exerciser.

Figure 17:
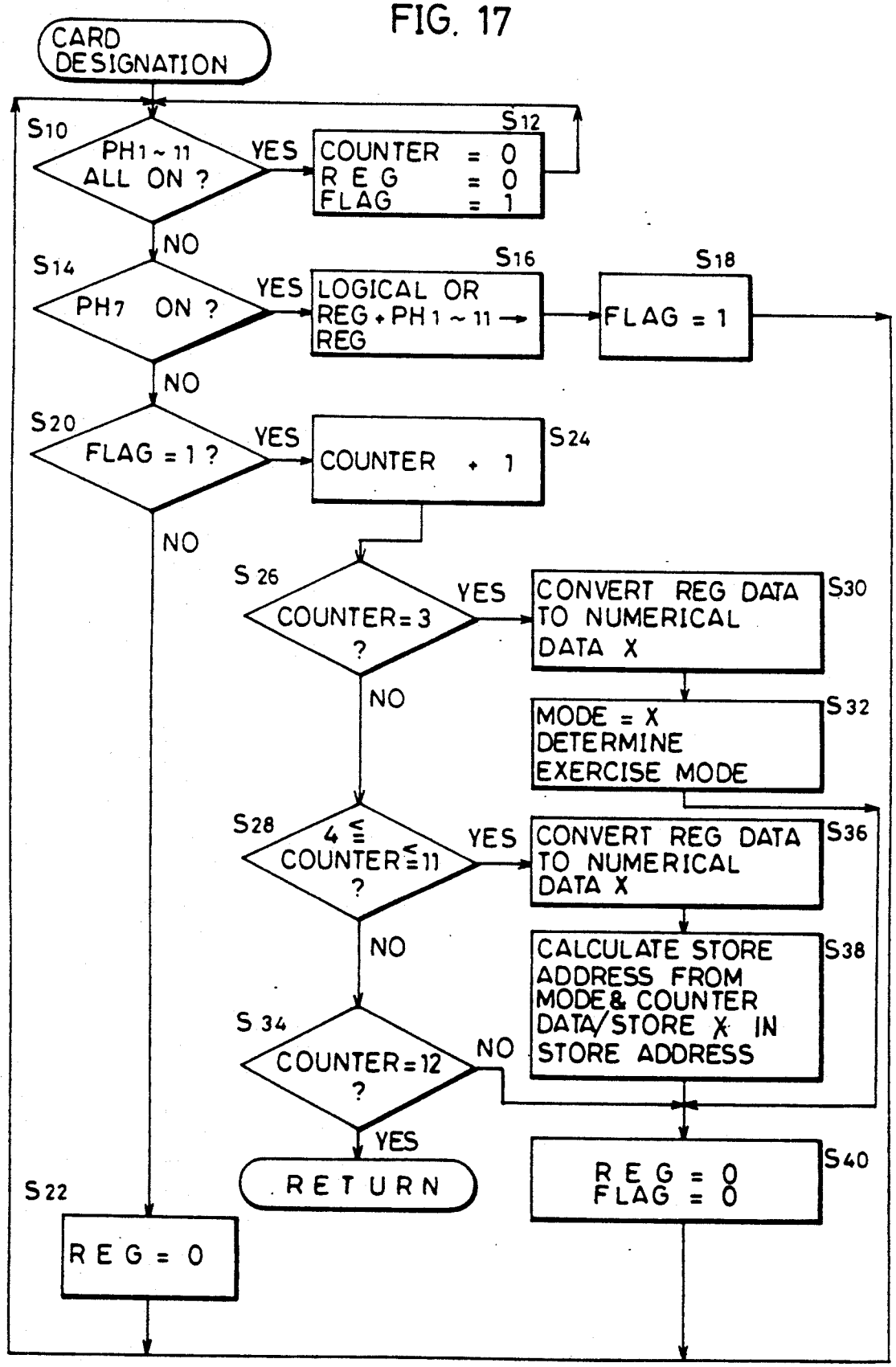
FIG. 17 is a flow chart showing specific contents of a card designating routine of FIG. 16.

FIG. 17 is a flow chart showing specific contents of the card designating routine shown in FIG. 16.

Before the description of this flow, the structure of the photo transistor will be described. As shown in FIGS. 11 and 12, 11 photo transistors PH1 to PH11 are arranged on the card reader perpendicular with the direction of insertion of the optical data card. PH7 represents a photo transistor for detecting position of a hole for data sampling corresponding to the timing detecting hole 73 shown in FIGS. 8A and 8B.

When the optical data card is inserted and the timing detecting hole 73 is positioned between the light emitting element and the photo transistor PH7, the photo transistor PH7 is turned on. Other photo transistors PH1 to PH6 and PH8 to PH9 are used for reading designated individual data.

First, in step S10, whether or not all the photo transistors PH1 to PH11 are on is determined. If all the transistors are on, it is determined that the optical card is not inserted, and in step S12, a register in the CPU for reading is reset. Namely, a counter value is set to "0"REG data is set to "0"the flag is set to "1" and the flow returns to step S10 for standby.

If not all of the photo transistors are on, whether or not the photo transistor PH7 is on is determined in step S14. If the photo transistor PH7 is on, data of the photo transistors PH1 to PH11 (determined by on/off of the respective photo transistors) are logically added in step S16 to be stored as the REG data, and in step S18, the flag is set to "1".

If the photo transistor PH7 is not on, whether or not the flag is "1" is determined in step S20. If the flag is "1"the counter is incremented by 1 in step S24, and whether or not the count value is 3 is determined in step S26. If the counter value is 3, the REG data is converted to numerical data X in step S30. FIG. 19 shows the correspondence between the REG data and the numerical data X.

In step S32, a mode value is set as the numerical value X, and the exerciser mode is determined based on the numerical value X. For example, in this embodiment, the data of the column A of the optical data card is read when the counter value is 3. Therefore, if the numerical value X is "0"it represents the test mode, and if the value is "2"it represents the auto training mode.

In step S40, the REG data is set to 0 and the flag is set to 0, and then the flow returns to step S10.

If the counter value is not 3 in step S26, it is determined in step S28 whether or not the counter value is not smaller than 4 and not larger than 11. If the counter value is in this range, the read REG data is converted to the numerical value data X based on the conversion table of FIG. 19.

In step S8, the types of data stored in the optical data card is determined based on the content of the counter value and the exercise mode determined in advance, and the numerical data X is stored in the corresponding address of the RAM 63. In step S40, the REG data is set to 0, the flag is set to 0 and the flow returns to the step S10.

If the counter value is out of the range in step S28, if the counter value is 12 or not is determined in step S34. If the counter value is not 12, the flow proceeds to step S40. If the value is 12, it is determined that the optical data card is fully inserted, reading operation by the card reader 36 is completed, and the flow proceeds to step S5 of the main routine shown in FIG. 16.

Figure 18:
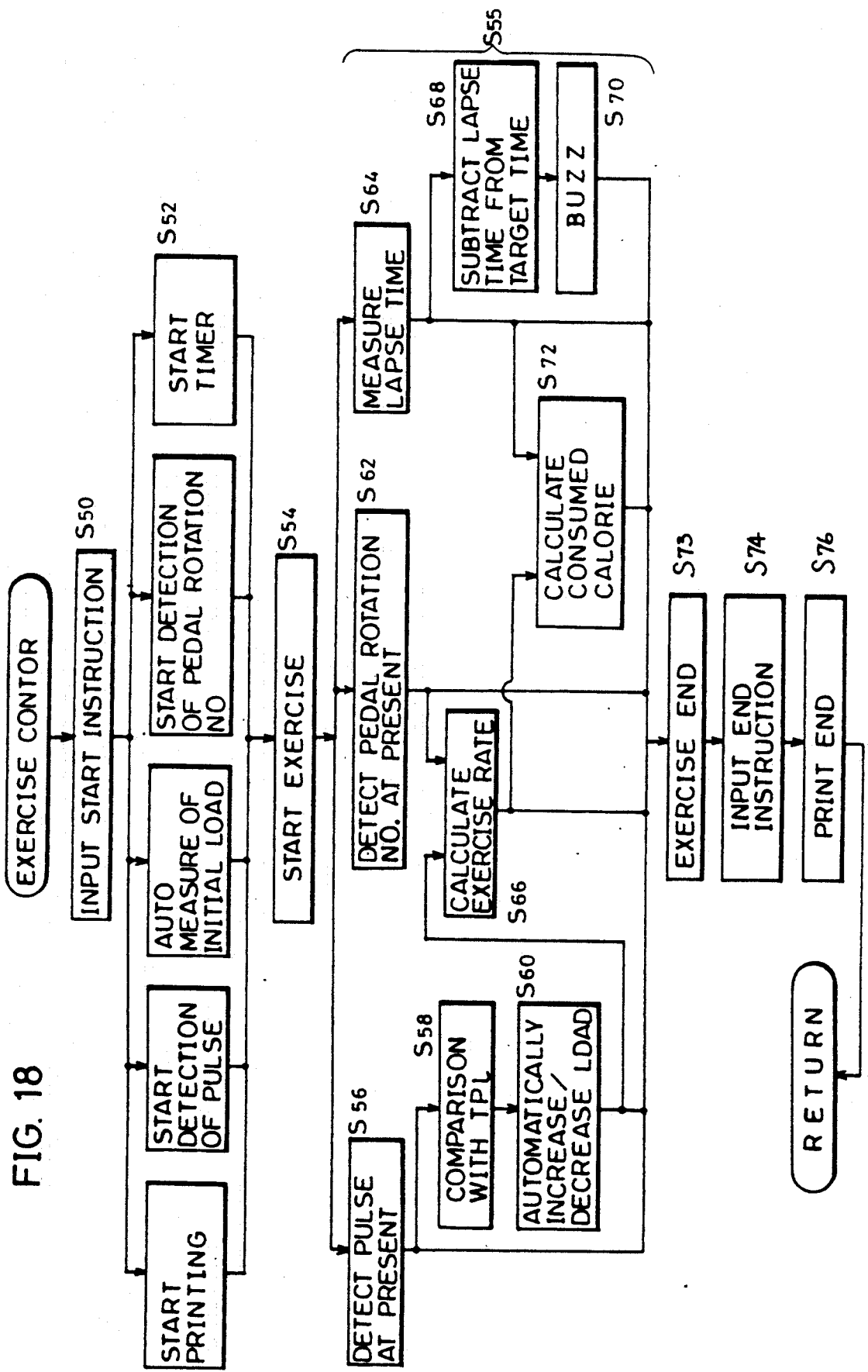
FIG. 18 is a flow chart showing specific contents of an exercise control routine of FIG. 16.

FIG. 18 is a flow chart showing specific contents of the exercise control routine shown in FIG. 16. In this figure, one example of a flow chart of automatic training mode is shown. However, as described above, a flow chart corresponding to the designated one of the respective exercise modes, designated by data card or manually is executed. Details of the exercise mode is disclosed in U.S. Ser. No. 773,306 filed by the applicant of the present application.

One example of the automatic training mode will be briefly described based on the flow chart.

When a start instructing signal is input by turning on of ADV button 50 in step S50, a microcomputer 24 operates various sensors and the timer so as to start detection of pulse rate, automatic setting of load initial value, detection of pedal rotation number, starts the operation of the timer and starts the operation of the printer (step S52). If the user starts pedaling (step S54), various control and operation shown in step S55 are executed by the microcomputer 24. Namely, the present pulse rate of the user is detected (step S56), comparison between the present pulse rate and the target pulse rate is done (step S58) and the load is automatically increased or decreased (S60). The present number of rotation of the pedal is detected (step S62), and the exercise rate is calculated based on the load value and the number of rotation of the pedal (step S66). Further, the lapse time is measured (step S64), the lapse time is subtracted from the target exercise time (step S68), and a buzzer is given when the target exercise time has lapsed (step S70). Based on the lapse time and the calculated exercise rate (step S66), the calorie consumed in the exercise of the user is calculated (step S72).

The above described various control and operation processes are carried out in parallel by time divisional interruption. When the exercise is completed (step S72) the flow waits for an input of end instruction (step S74), the printer prints out the consumed calorie and stops (step S76), and the flow returns to the main routine of FIG. 16.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An exerciser, comprising:
   load means including pedals for applying a load responsive to rotation of said pedals by a user;
   pulse data detecting means for detecting pulse data during pedaling by the user;
   data storing means for storing individual data of the user; said data storing means comprising a data card for storing individual data regarding the user;
   data receiving means into which said data card is arbitrarily inserted;
   data reading means for reading said individual data stored in said data card inserted into said data receiving means; said data reading means comprising a light emitter and photo receptor for sandwiching said data card for optically reading data stored in said data card; and
   control means for controlling the magnitude of said load applied by said load means, based on said detected pulse data and said read individual data.

2. An exerciser according to claim 1 wherein said data storing means stores data regarding the age and physical strength of the user.

3. An exerciser, comprising:
   loading means including pedals for applying a load responsive to rotation of said pedals by a user;
   pulse data detecting means for detecting pulse data of said user;
   a data card in which individual data regarding the user are stored, said data card including a card base having
      a transparent plate;
      a light intercepting film formed on said plate, with a prescribed portion of said intercepting film passing light, and
      a light stopping film formed at least on one surface of said card base at a position corresponding to said prescribed portion for stopping passage of light through said data card;
   optical reading means for optically reading said individual data stored in said data card; and
   control means for controlling the magnitude of load applied by said loading means, based on said detected pulse data and said read individual data.

4. An exerciser according to claim 3, wherein said individual data includes the age and physical strength of the user.

5. An exerciser according to claim 3, wherein said optical reading means comprises:
   an inlet into which said data can be inserted;
   at least a light emitter and a photoreceptor for sandwiching said data card;
   a card holder for holding said data card inserted into said inlet, said card holder formed of a light intercepting member with an opening, said opening allowing reception, by said photoreceptor, of light emitted from said light emitter; and
   a projecting portion on said card holder for preventing contact of said light stopping film formed on said data card with said card holder, when said data card is inserted and withdrawn for said inlet; wherein
   said photoreceptor receives light from said light emitter through said prescribed portion of said data card and through said opening of said card holder, when said data card is inserted into said inlet.

* * * * *